US012789872B2

(12) United States Patent
Dong et al.

(10) Patent No.: US 12,789,872 B2
(45) Date of Patent: Nov. 10, 2026

(54) INTEGRATION-ORIENTED INTELLIGENT SPEED TRAJECTORY OPTIMIZATION METHOD AND SYSTEM FOR AUTONOMOUS TRAIN

(71) Applicant: Beijing Jiaotong University, Beijing (CN)

(72) Inventors: Hairong Dong, Beijing (CN); Min Zhou, Beijing (CN); Haifeng Song, Beijing (CN); Ling Liu, Beijing (CN); Xiaoyong Wang, Beijing (CN); Xuan Liu, Beijing (CN)

(73) Assignee: Tongji University, Shanghai (CN)

( * ) Notice: Subject to any disclaimer, the term of this patent is extended or adjusted under 35 U.S.C. 154(b) by 15 days.

(21) Appl. No.: 19/031,851

(22) Filed: Jan. 18, 2025

(65) Prior Publication Data

US 2026/0001582 A1 Jan. 1, 2026

(30) Foreign Application Priority Data

Jun. 27, 2024 (CN) ........................ 202410845621.3

(51) Int. Cl.
*B61L 99/00* (2006.01)
*G06N 3/092* (2023.01)

(52) U.S. Cl.
CPC ............ *B61L 99/002* (2024.01); *G06N 3/092* (2023.01); *B61L 2210/02* (2013.01)

(58) Field of Classification Search
CPC ............... B61L 99/002; B61L 2210/02; B61L 15/0062; B61L 27/04; B61L 27/20; B61L 27/60; G06N 3/092; G06N 3/006; G06N 3/08; G06N 7/01; Y02T 10/40; G06F 30/27; G06F 30/15
See application file for complete search history.

(56) References Cited

FOREIGN PATENT DOCUMENTS

| | | | | |
|---|---|---|---|---|
| CN | 115689044 A | | 2/2023 | |
| CN | 116090336 A | * | 5/2023 | ............ G06F 30/27 |
| CN | 116513273 A | | 8/2023 | |

OTHER PUBLICATIONS

Machine Translation of CN116090336A PDF File Name: "CN116090336A_Machine_Translation.pdf" (Year: 2023).*

(Continued)

*Primary Examiner* — Grant Moubry
*Assistant Examiner* — Ruben Picon-Feliciano
(74) *Attorney, Agent, or Firm* — Nitin Kaushik

(57) ABSTRACT

The present invention relates to an integration-oriented intelligent speed trajectory optimization method and system for an autonomous train. The method includes: constructing an autonomous train speed trajectory optimization model under virtual coupling based on a discrete distance; converting the autonomous train speed trajectory optimization model into a Markov decision process; using a deep reinforcement learning algorithm TD3 to train a neural network and an agent in the Markov decision process, to obtain a trained neural network and agent; and deploying the trained neural network and agent to an autonomous train, to perform an autonomous train speed trajectory optimization decision, so that safe, efficient, and comfortable train autonomous operations can be implemented.

7 Claims, 11 Drawing Sheets

(56) References Cited

OTHER PUBLICATIONS

Paper Titled: "Multiobjective Optimization for Train Speed Trajectory"—Wei Shang Guan et al., IEEE, Date of Publication: Mar. 10, 2015 (Year: 2015).*
Paper Titled: "Single-Train Trajectory Optimization"—Shaofeng Lu et al., IEEE, Date of Publication: Jan. 14, 2013 (Year: 2013).*
Paper Titled: "Research on Multi-Objective Optimization and Control Algorithms for Automatic Train Operation"—Kai-wei Liu et al., Energies Journal Paper Publication, Published: Oct. 11, 2019 (Year: 2019).*

* cited by examiner

INTEGRATION-ORIENTED INTELLIGENT SPEED TRAJECTORY OPTIMIZATION METHOD AND SYSTEM FOR AUTONOMOUS TRAIN

CROSS-REFERENCE TO RELATED APPLICATIONS

The application claims priority to Chinese patent application No. 202410845621.3, filed on Jun. 27, 2024, the entire contents of which are incorporated herein by reference.

TECHNICAL FIELD

The present invention relates to the technical field of train operation optimization, and in particular, to an integration-oriented intelligent speed trajectory optimization method and system for an autonomous train.

BACKGROUND

In recent years, the global railway transportation system has developed rapidly due to the characteristics of high speed, large transportation capability, and high comfort of railway transportation. Due to the increasing demand for passenger and freight transportation and the increasing frequency of emergencies, the integration of train dispatching and control is a key technology to solve the contradiction between transportation capability and demand at this stage. Since some railway lines have reached the upper limit of the transportation capability, the current train control system cannot increase the transportation capability by increasing the operation number of trains. Compared with building new railways, improving the traffic capability of the railway is a more economical and effective solution. Therefore, in the premise of ensuring the safe operation of trains, shortening the train operation headway is a necessary means to implement the integration of train dispatching and control and improve the line capacity and operation efficiency.

With the development of train-to-train communication and automatic control technology, virtual coupling enables trains to operate in a relative braking protection mode to improve the train operation efficiency and line capacity. Under the virtual coupling, the rear train always takes the train tail position of the front train after emergency braking is performed as a braking end point and dynamically adjusts the speed according to the speed position information of the front train. In addition, the demand for railway transportation may cause trains to couple or decouple dynamically, especially for high-speed or intercity railways. Two trains may be coupled after leaving the switch and operating from two different tracks to the same track or separated when operating from the same track to two different tracks. This requires that the train should not only operate safely in the relative braking protection mode, but also make the optimum decision on occupying key line resources such as switch and routes according to the operation state of the front train while considering energy saving and comfortable operation.

The application of the automatic train operation (ATO) system solves the problems of poor uniformity, insufficient accuracy, and the like brought by traditional manual driving and provides conditions for shortening the tracking headway between trains. However, the current ATO system cannot implement communication between trains to complete information interaction, and the interlocking system needs to lock and clear the routes, which may seriously reduce the flexibility of virtual coupling. An autonomous train with a decision capability has the ability to communicate with an adjacent train and can also make autonomous decisions and apply for occupying line resources according to the train operation and line resource utilization states on the line. Therefore, the autonomous train operation is an effective solution for implementing integration-oriented virtual coupling.

In summary, in order to implement safe, efficient, and comfortable train autonomous operations, it is necessary to design an integration-oriented intelligent speed trajectory optimization method for an autonomous train.

SUMMARY

(I) Technical Problems to be Solved

In view of the above defects and deficiencies of an existing technology, the present invention provides an integration-oriented intelligent speed trajectory optimization method and system for an autonomous train, to implement safe, efficient, and comfortable train autonomous operations.

(II) Technical Solution

To achieve the above purpose, main technical solutions adopted by the present invention are as follows:

According to a first aspect, an embodiment of the present invention provides an integration-oriented intelligent speed trajectory optimization method for an autonomous train, including: constructing an autonomous train speed trajectory optimization model under virtual coupling based on a discrete distance; converting the autonomous train speed trajectory optimization model into a Markov decision process; using a deep reinforcement learning algorithm TD3 to train a neural network and an agent in the Markov decision process, to obtain a trained neural network and agent; and deploying the trained neural network and agent to an autonomous train, to perform an autonomous train speed trajectory optimization decision.

The autonomous train speed trajectory optimization model includes a plurality of constraint conditions; a first constraint condition in the plurality of constraint conditions is as follows:

$$d(s) + ebd(v^a(s)) + \Delta_l + \Delta_{sm} \le P^l(t(s)) + ebd\left(V^l(t(s))\right);$$

$$\forall\, s', s \in S \text{ if } P_{sw}^{out} \le d(s) + ebd(v^a(s)) \le P_{sw}^{in};$$

and in the formula, s represents a segment index; $ebd(v^a(s))$ represents an emergency braking distance of an autonomous train a at a segment s when an end speed is v(s); $\Delta_l$ represents a length of a front train; $\Delta_{sm}$ represents a minimum safety margin; $P^l(t(s))$ represents a position of the front train at a moment t(s); t(s) represents time for the autonomous train to operate to a tail end of the segment s; $V^l(t(s))$ represents a speed of the front train at the moment t(s); s' represents a segment that is connected to and in front of the segment s; S represents a segment index set;

$$P_{sw}^{out}$$

represents a position of an outbound switch junction; and $$P_{sw}^{in}$$

represents a position of an inbound switch.

In a possible embodiment, a second constraint condition in the plurality of constraint conditions is as follows:

$$\begin{cases} t^a(S_{sw}^{out}-1) \geq t_{out}^l + \Delta_{sw} \\ t^a(S_{sw}^{in}-1) \geq t_{in}^l + \Delta_{sw} \end{cases};$$

and in the formula, $$S_{sw}^{out}$$

represents the segment index at which the outbound switch is located;

$$t^a(S_{sw}^{out}-1)$$

represents time for the autonomous train a to reach the outbound switch;

$$t_{out}^l$$

represents the time for the front train to leave the outbound switch; $\Delta_{sw}$ represents the duration of the switch rotation action;

$$S_{sw}^{in}$$

represents the segment index at which the inbound switch is located;

$$t^a(S_{sw}^{in}-1)$$

represents time for the autonomous train a to reach the inbound switch; and $$t_{in}^l$$

represents time for the front train to leave the inbound switch.

In a possible embodiment, the autonomous train speed trajectory optimization model further includes an objective function; the objective function is as follows:

$$J = \sum_{s\in S}[\alpha \times rt^a(s) + \beta \times ec^a(s) + \gamma \times \delta_{acc}^a(s)];$$

and in the formula, J represents a minimum objective function value; α represents a first weight; $rt^a(s)$ represents total operation time of the autonomous train a at the segment s; β represents a second weight; $ec^a(s)$ represents total operation energy consumption of the autonomous train a at the segment s; γ represents a third weight; and $$\delta_{acc}^a$$

(s) represents an accumulated value of an acceleration change of the autonomous train a at the segment s.

In a possible embodiment, the using a deep reinforcement learning algorithm TD3 to train a neural network and an agent in the Markov decision process includes: generating a plurality of training scenarios performing reinforcement learning on the agent in the Markov decision process, where each training scenario in the plurality of training scenarios includes but is not limited to a line length, a line topological structure, and line speed restriction information; a training completion judgment step: judging whether training of the neural network and the agent is completed; if the training of the neural network and the agent is not completed, randomly selecting a target training scenario from the plurality of training scenarios, resetting a reinforcement learning environment based on the target training scenario, and determining a maximum speed trajectory of the autonomous train and a planned speed trajectory of the front train; a storage execution step: selecting an action according to state information of a current environment by the agent and outputting the action to the environment, updating the state information and calculating a reward value by the environment after executing the action, storing the action, state information of a previous time step of the current environment, state information of a current time step of the current environment, and the reward value in a memory buffer as a group of storage data, selecting random target group storage data from the memory buffer, and updating a parameter of the neural network by using the target group storage data; judging whether the autonomous train reaches an end point; and if the autonomous train does not reach the end point, returning to execute the storage execution step; and if the autonomous train reaches the end point, returning to the training completion judgment step, and until the training is completed, stopping a cycle.

In a possible embodiment, a state of the Markov decision process is as follows:

$$\phi_s = [v^a(s'), d(s'), l(s), V^a(s), rrt^a(s'), rd^a(s'), acc^a(s'), a_s^{max}, a_s^{min}];$$

and in the formula, $\phi_s$ represents the state of the Markov decision process; $v^a(s')$ represents the end speed of the autonomous train a at the segment s'; d(s') represents a position of a tail end of the segment s'; l(s) represents the length of the segment s; $V^a(s)$ represents a maximum speed of the autonomous train a at the segment s; $rrt^a(s')$ represents remaining operation time of the autonomous train a at the tail end of the segment s' to a next switch; $rd^a(s')$ represents a distance of the autonomous train a at the tail end of the segment s' to the next switch; $acc^a(s')$ represents acceleration of the autonomous train a at the tail end of the segment s';

$$a_s^{max}$$

represents a maximum safety action of the autonomous train a at the segment s; and $$a_s^{min}$$

represents a minimum safety action of the autonomous train a at the segment s.

In a possible embodiment, a reward function of the Markov decision process is as follows:

$$r_s = \begin{cases} 1 - \frac{rt^a(s)}{\alpha} - \frac{ec^a(s)}{\beta} - \frac{\delta^a_{acc}(s)}{\gamma}, & \text{case1} \\ \mu, & \text{case2} \end{cases};$$

and in the formula, $r_s$ represents the reward value; case1 represents that the action selected by the agent does not violate a constraint of the first constraint condition or the second constraint condition; μ represents a preset negative number; and case2 represents that the action selected by the agent violates the constraint of the first constraint condition or the second constraint condition.

In an embodiment, an environment of the Markov decision process includes a train dynamics simulation environment and a train operation environment under the virtual coupling.

According to a second aspect, an embodiment of the present invention provides an integration-oriented intelligent speed trajectory optimization system for an autonomous train, including: a construction module, configured to construct an autonomous train speed trajectory optimization model under virtual coupling based on a discrete distance;

a conversion module, configured to convert the autonomous train speed trajectory optimization model into a Markov decision process; a training module, configured to use a deep reinforcement learning algorithm TD3 to train a neural network and an agent in the Markov decision process, to obtain a trained neural network and agent; and a deployment module, configured to deploy the trained neural network and agent to an autonomous train, to perform an autonomous train speed trajectory optimization decision, where the autonomous train speed trajectory optimization model includes a plurality of constraint conditions; a first constraint condition in the plurality of constraint conditions is as follows:

$$d(s) + ebd(v^a(s)) + \Delta_l + \Delta_{sm} \le P^l(t(s)) + ebd\left(V^l(t(s))\right);$$

$$\forall s', s \in S \text{ if } P^{out}_{sw} \le d(s) + ebd(v^a(s)) \le P^{in}_{sw};$$

and in the formula, s represents a segment index; $ebd(v^a(s))$ represents an emergency braking distance of an autonomous train a at a segment s when an end speed is v(s); $\Delta_l$ represents a length of a front train; $\Delta_{sm}$ represents a minimum safety margin; $P^l(t(s))$ represents a position of the front train at a moment t(s); t(s) represents time for the autonomous train to operate to a tail end of the segment s; $V^l(t(s))$ represents a speed of the front train at the moment t(s); s' represents a segment that is connected to and in front of the segment s; S represents a segment index set;

$$P^{out}_{sw}$$

represents a position of an outbound switch junction; and $$P^{in}_{sw}$$

represents a position of an inbound switch junction.

According to a third aspect, an embodiment of the present invention provides a storage medium. The storage medium stores a computer program, and the computer program executes the method according to the first aspect or any one of optional implementations of the first aspect when executed by a processor. The storage medium in the present invention may also be referred to as a computer-readable storage medium.

According to a fourth aspect, an embodiment of the present invention provides an electronic device, including: a processor, a memory, and a bus. The memory stores a machine-readable instruction executable by the processor. When the electronic device operates, the processor communicates with the memory through the bus. The machine-readable instruction executes the method according to the first aspect or any one of optional implementations of the first aspect when executed by the processor.

According to a fifth aspect, the present invention provides a computer program product. The computer program product enables a computer to execute the method according to the first aspect or any one of optional implementations of the first aspect when executed on the processor.

(III) Beneficial Effects

The present invention has beneficial effects as follows:

Embodiments of the present invention provide an integration-oriented intelligent speed trajectory optimization method and system for an autonomous train. An autonomous train speed trajectory optimization model under virtual coupling based on a discrete distance is constructed, and the autonomous train speed trajectory optimization model is converted into a Markov decision process. A deep reinforcement learning algorithm TD3 is used to train a neural network and an agent in the Markov decision process, and the trained neural network and agent are deployed to an autonomous train, to perform an autonomous train speed trajectory optimization decision, so that safe, efficient, and comfortable train autonomous operations can be implemented.

To make the purposes, features, and advantages to be implemented by the embodiments of the present invention clearer and more comprehensible, the preferred embodiments are specially provided and are described in detail below with reference to the accompanying drawings.

BRIEF DESCRIPTION OF THE DRAWINGS

To describe the technical solutions in the embodiments of the present invention more clearly, the following briefly describes the accompanying drawings required for describing the embodiments of the present invention. It should be understood that, the following accompanying drawings show merely some embodiments of the present invention, and therefore should not be regarded as a limitation on the scope. Those of ordinary skill in the art may still derive other related drawings from these accompanying drawings without creative efforts.

DETAILED DESCRIPTION OF THE EMBODIMENTS

To better explain the present invention and facilitate understanding, the present invention is described in detail below with reference to the specific implementations and the accompanying drawings.

For problems of changeable virtual coupling scenarios, difficulty of dynamic decoupling and coupling decisions, low utilization of line resources, and the like caused by high-speed railways, intercity railways, and other railway lines with complex line structures, an embodiment of the present invention provides an integration-oriented intelligent speed trajectory optimization method and system for an autonomous train. An autonomous train speed trajectory optimization model under virtual coupling based on a discrete distance is constructed, the autonomous train speed trajectory optimization model is converted into a Markov decision process, a deep reinforcement learning algorithm TD3 is used to train a neural network and an agent in the Markov decision process, and a trained neural network and agent are deployed to an autonomous train, to perform an autonomous train speed trajectory optimization decision, so that safe, efficient, and comfortable train autonomous operations can be implemented.

To better understand the above technical solutions, exemplary embodiments of the present invention will be described in more detail below with reference to the accompanying drawings. Although the exemplary embodiments of the present invention are shown in the accompanying drawings, it should be understood that the present invention may be implemented in various forms and should not be limited by the embodiments described herein. On the contrary, these embodiments are provided for aims that the present invention can be understood more clearly and thoroughly and the scope of the present invention can be fully conveyed to a person skilled in the art.

Figure 1:
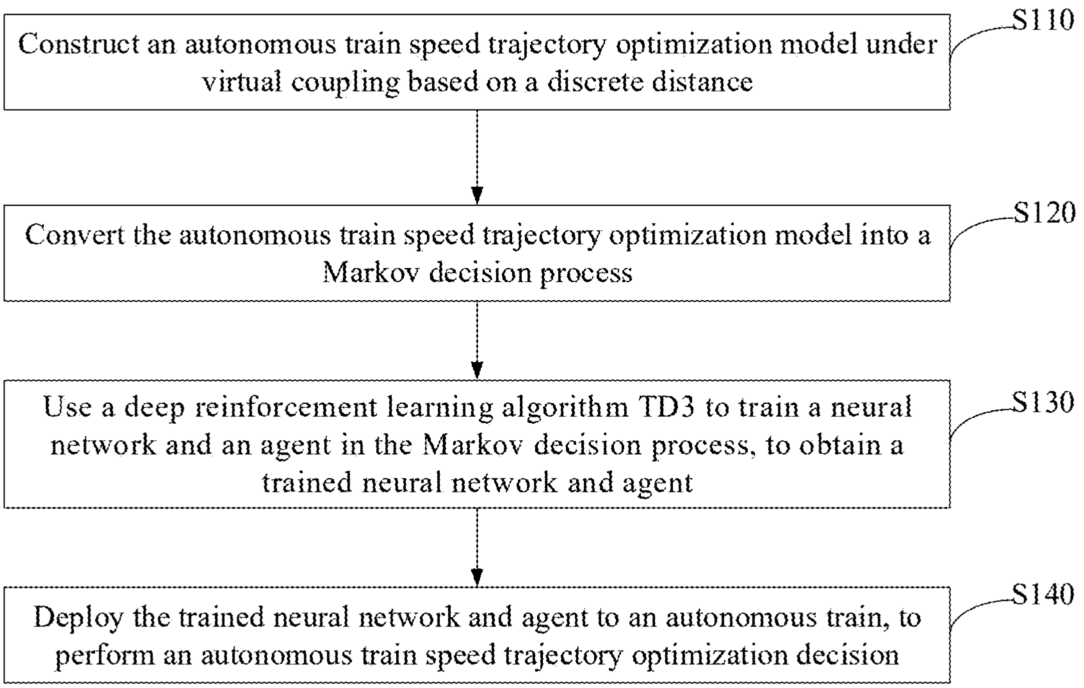
FIG. 1 is a flowchart of an integration-oriented intelligent speed trajectory optimization method for an autonomous train according to an embodiment of the present invention.

Referring to FIG. 1, FIG. 1 is a flowchart of an integration-oriented intelligent speed trajectory optimization method for an autonomous train according to an embodiment of the present invention. It should be understood that the method may be executed by an apparatus optimizing an autonomous train speed trajectory, and a specific apparatus of the apparatus may be set according to actual requirements. The embodiment of the present invention is not limited thereto. For example, the apparatus may be a computer, a server, or the like. Specifically, the method includes:

- step S110: constructing an autonomous train speed trajectory optimization model under virtual coupling based on a discrete distance;
- step S120: converting the autonomous train speed trajectory optimization model into a Markov decision process;
- step S130: using a deep reinforcement learning algorithm TD3 to train a neural network and an agent in the Markov decision process, to obtain a trained neural network and agent; and
- step S140: deploying the trained neural network and agent to an autonomous train, to perform an autonomous train speed trajectory optimization decision.

For step S110, the autonomous train speed trajectory optimization model includes a plurality of constraint conditions and an objective function.

It should be understood that a specific condition of the constraint condition and a specific function of the objective function both may be set according to actual requirements. The embodiment of the present invention is not limited thereto.

Optionally, the autonomous train may be regarded as a mass point, and a subjected force during operation includes an actual traction or braking force output by the autonomous train, a Davis force, and an additional resistance force. A fundamental dynamics model of the autonomous train is as shown in a formula (1) that is specifically as follows:

$$acc^a(s) = \frac{of^a(s) - df(v^a(s')) - af(s)}{\rho \times m^a} \quad \forall\, s', s \in S; \tag{1}$$

in the formula, $acc^a(s)$ represents acceleration of an autonomous train a at a segment s; $of^a(s)$ represents a force actually output by the autonomous a at the segment s; s' represents a segment that is connected to and in front of the segment s; $v^a(s')$ represents an end speed of the autonomous train a at a segment s'; $df(v^a(s'))$ is used to represent that the end speed of the autonomous train a at the segment s' is used to calculate a Davis force to which the autonomous train is subjected at the segment s; af(s) represents an additional force of the segment s on the train; ρ represents a rolling coefficient; $m^a$ represents train mass of the autonomous train a; and S represents a segment index set.

The force actually output by the autonomous train a at the segment s may be calculated according to a formula (2) that is specifically as follows:

$$\begin{cases} of^a(s) = p^a_{tf}(s) \times tf^a(v^a(s')) + p^a_{bf}(s) \times bf^a(v^a(s')) \\ p^a_{tf}(s) \times p^a_{bf}(s) = 0, \quad 0 \le p^a_{bf}(s) \le 1, \quad 0 \le p^a_{tf}(s) \le 1\,; \\ \forall\, s', s \in S \end{cases} \tag{2}$$

in the formula, $of^a(s)$ represents the force actually output by the autonomous train a at the segment s;

$$p_{tf}^a$$

(s) resents a ratio of an actual traction force output by the autonomous train a at the segment s to a maximum traction force that can be output;

$$p_{bf}^a$$

(s) represents a ratio of an actual braking force output by the autonomous train a at the segment s to a maximum braking force that can be output; the end speed of the autonomous train at the segment s' is used to calculate the maximum traction force and braking force that can be output by the autonomous train at the segment s, and $tf^a(v^a(s'))$ represents that the end speed of the autonomous train a at the segment s' is used to calculate the maximum traction force that can be output by the autonomous train at the segment s; and $bf^a(v^a(s'))$ represents that the end speed of the autonomous train a at the segment s' is used to calculate the maximum braking force that can be output by the autonomous train at the segment s.

A relationship between end speeds of the autonomous train at two continuous segments is described through a formula (3) that is specifically as follows:

$$v^a(s)^2 - v^a(s')^2 = 2 \times acc^a(s) \times l(s) \,\forall s', s \in S; \tag{3}$$

and in the formula, $v^a(s)$ represents an end speed of the autonomous train a at the segment s; $v^a(s')$ represents the end speed of the autonomous train a at the segment s'; $acc^a(s)$ represents the acceleration of the autonomous train a at the segment s; and l(s) represents a length of the segment s.

A change amount of the acceleration of the autonomous train at the segment s is calculated through a formula (4) that is specifically as follows:

$$\delta_{acc}^a(s) = |acc^a(s) - acc^a(s')| \,\forall s', s \in S; \tag{4}$$

and in the formula, $$\delta_{acc}^a$$

(s) represents the change amount of the acceleration of the autonomous train a at the segment s; and $acc^a(s')$ represents acceleration of the autonomous train a at the segment s'.

Actual operation time of the autonomous train at the segment s may be calculated according to a formula (5) that is specifically as follows:

$$rt^a(s) = \frac{2 \times l(s)}{v^a(s') + v^a(s)} \,\forall s', s \in S; \tag{5}$$

and in the formula, $rt^a(s)$ represents the actual operation time of the autonomous train a at the segment s; l(s) represents the length of the segment s; $v^a(s)$ represents the end speed of the autonomous train a at the segment s; and $v^a(s')$ represents the end speed of the autonomous train a at the segment s'.

The autonomous train may generate a maximum speed trajectory according to static line information (for example, a slope gradient and a static speed restriction) and a received temporary speed restriction order, and a formula (6) limits a speed of the autonomous train at a tail end of the segment s to no more than a maximum speed, which is specifically as follows:

$$V^a(s) \le \widetilde{V^a(s)} \,\forall s', s \in S; \tag{6}$$

and in the formula, $\widetilde{V^a(s)}$ represents the maximum speed of the autonomous train a at the tail end of the segment s.

Operation energy consumption of the autonomous train at the segment s is calculated through a formula (7) that is specifically as follows:

$$ec^a(s) = p_{tf}^a(s) \times tf^a(v^a(s)) \times l(s); \tag{7}$$

and in the formula, $ec^a(s)$ represents the operation energy consumption of the autonomous train a at the segment s;

$$p_{tf}^a$$

(s) represents the ratio of the actual traction force output by the autonomous train a at the segment s to the maximum traction force that can be output; $tf^a(v^a(s))$ represents the maximum traction force that can be output by the autonomous train a at the segment s; and l(s) represents the length of the segment s.

A requirement of tracking a front train thereof safely by the autonomous train is ensured through a formula (8) that is specifically as follows:

$$d(s) + ebd(v^a(s)) + \Delta_l + \Delta_{sm} \le P^l(t(s)) + ebd\big(V^l(t(s))\big); \tag{8}$$

$$\forall s', s \in S \text{ if } P_{sw}^{out} \le d(s) + ebd(v^a(s)) \le P_{sw}^{in}; \quad (8)$$

and

In the formula, s represents a segment index; $d(s)=\Sigma_{s^* \in [0, \ldots, s]} l(s^*)$, where s* represents any one of segments from a segment 0 to the segment s, and l(s*) represents a length of the segment s*; $ebd(v^a(s))$ represents an emergency braking distance of the autonomous train a at the segment s when an end speed is v(s); $\Delta_l$ represents a length of the front train; $\Delta_{sm}$ represents a minimum safety margin;

since a speed trajectory $V^l$ of the front train is known, $P^l(t(s))$ may be used to represent a position of the front train at a moment t(s); t(s) represents time for the autonomous train to operate to the tail end of the segment s, $t(s)=\Sigma_{s^* \in [0, \ldots, s]} rt^a(s^*)$, s* represents any one of segments from the segment 0 to the segment s, and $rt^a(s^*)$ represents operation time of the autonomous train at the segment s*; since the speed trajectory $V^l$ of the front train is known, $V^l(t(s))$ may be used to represent a speed of the front train at the moment t(s), and ebd $(V^l(t(s)))$ represents an emergency braking distance when the speed is $V^l(t(s))$; s' represents the segment that is connected to and in front of the segment s; S represents the segment index set;

$$P_{sw}^{out}$$

represents a position of an outbound switch; and $$P_{sw}^{in}$$

represents a position of an inbound switch.

It should be noted herein that in the virtual coupling, two front and rear trains operate according to a relative braking mode, that is, after the two front and rear trains perform emergency braking simultaneously, a position of a rear train head cannot exceed a position at a front train tail minus the safety margin $\Delta_{sm}$. Since the autonomous train may be on a different route from a front train thereof when approaching an outbound switch, that is, the autonomous train and the front train operate parallelly, only when an end point of emergency braking of the autonomous train exceeds a switch junction, the autonomous train and the front train need to meet a safety rule of relative braking. Similarly, when the end point of the emergency of the autonomous train exceeds a switch junction of an inbound route to be reached, even the autonomous train and the front train still operate on the same track, the autonomous train and the front train do not need to comply with the safety rule of relative braking.

Figure 2:
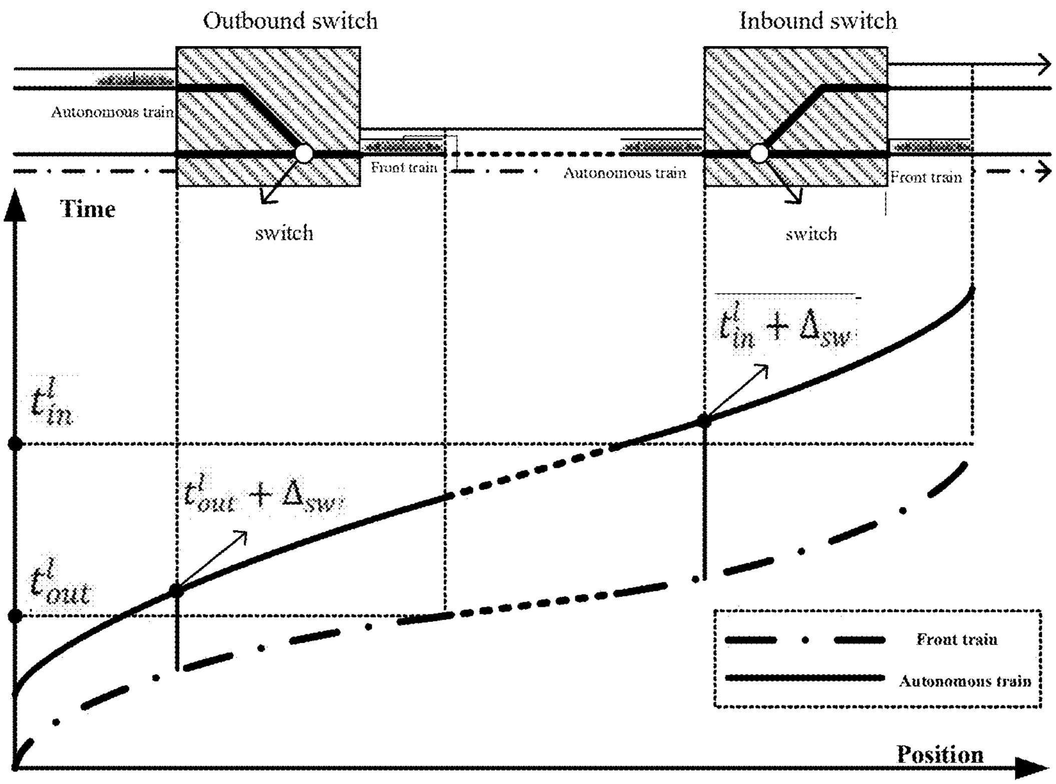
FIG. 2 is a schematic diagram of a limitation of a switch on virtual coupling according to an embodiment of the present invention.

A safe operation of the autonomous train at a switch segment may be ensured through a formula (9). Influences of switches on the autonomous train in a virtual coupling operation mode are as shown in FIG. 2. Solid lines and dash-dotted lines in an upper part of the figure represent operation paths of the front train and the autonomous train respectively, and two rectangular shaded parts represent the switches. Thick solid lines and dash-dotted lines in a lower part represent position-time trajectories of the front train and the autonomous train respectively. The front train passes through a first station from a main line, and the autonomous train operates on a side line. Therefore, the outbound switch needs to be switched from a normal position state to a reverse position state, which causes that the two front and rear trains may conflict at the switch. The autonomous train can reach a start point of the switch only when the outbound switch is switched to the reverse position state.

As shown in FIG. 2, time for the front train to leave the switch is $$t_{out}^l,$$

so that the switch can complete state rotation only at $$t_{out}^l + \Delta_{sw} \cdot \Delta_{sw}$$

is duration of a switch rotation action, so that earliest time for the autonomous train to reach the switch is $$t_{out}^l + \Delta_{sw},$$

that is, $$t^a(s_{sw}^{out} - 1) \geq t_{out}^l + \Delta_{sw}.$$

Similarly, earliest time $$t^a(s_{sw}^{in} - 1)$$

for the autonomous train to reach an inbound switch of a next station is at least $$t_{in}^l + \Delta_{sw} \cdot S_{sw}^{out}$$

represents a segment index at which the outbound switch is located; and $$S_{sw}^{in}$$

represents a segment index at which the inbound switch is located.

The formula (9) is specifically as follows:

$$\begin{cases} t^a(S_{sw}^{out} - 1) \geq t_{out}^l + \Delta_{sw} \\ t^a(S_{sw}^{in} - 1) \geq t_{in}^l + \Delta_{sw} \end{cases};$$

and in the formula, $$S_{sw}^{out}$$

represents the segment index at which the outbound switch is located;

$$t^a(S_{sw}^{out} - 1)$$

represents time for the autonomous train a to reach the outbound switch;

$$t_{out}^l$$

represents the time for the front train to leave the outbound switch; $\Delta_{sw}$ represents the duration of the switch rotation action;

$$S_{sw}^{in}$$

represents the segment index at which the inbound switch is located;

$$t^a\left(S_{sw}^{in}-1\right)$$

represents time for the autonomous train a to reach the inbound switch; and $$t_{in}^{l}$$

represents time for the front train to leave the inbound switch.

Optionally, the objective function of the autonomous train speed trajectory optimization model is as shown in a formula (10), which is a minimized weighted sum of total operation time, total energy consumption, and an accumulated value of an acceleration change that are of the autonomous train and is specifically as follows:

$$J=\sum\nolimits_{s\in S}[\alpha\times rt^a(s)+\beta\times ec^a(s)+\gamma\times\delta_{acs}^a(s)]; \tag{10}$$

and in the formula, J represents a minimum objective function value; α represents a first weight; $rt^a(s)$ represents total operation time of the autonomous train a at the segment s; β represents a second weight; $ec^a(s)$ represents total operation energy consumption of the autonomous train a at the segment s; γ represents a third weight; and $$\delta_{acs}^a(s)$$

represents an accumulated value of an acceleration change of the autonomous train a at the segment s.

For step S130, the using a deep reinforcement learning algorithm TD3 to train a neural network and an agent in the Markov decision process, to obtain a trained neural network and agent may be set according to actual requirements. The embodiment of the present invention is not limited thereto.

It should be noted herein that the neural network includes an LSTM network, an Actor network, and a Critic network.

Figure 3:
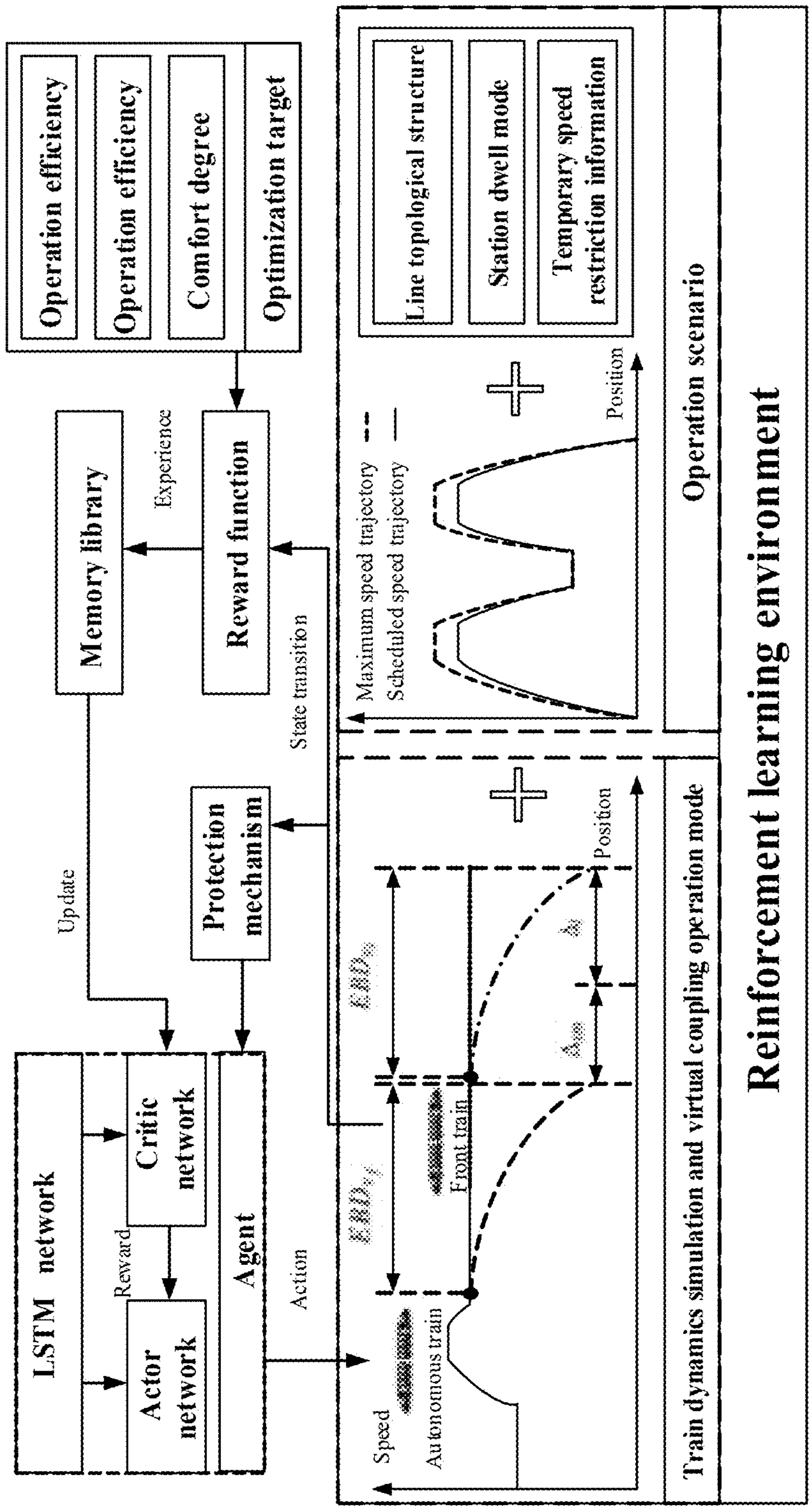
FIG. 3 is a schematic diagram of a reinforcement learning structure according to an embodiment of the present invention.

Optionally, a deep reinforcement learning framework constructed in the present invention is as shown in FIG. 3. Referring to FIG. 3, an environment includes two parts. A first part is train dynamics simulation under virtual coupling, and the other part is a train operation scenario. After the environment executes an action selected by the agent, an environment state is switched to a next state, and a reward function is related to train operation efficiency, energy consumption, and a comfort degree. The above elements may be stored in a memory buffer of the agent during training to update the neural network. Since the LSTM is introduced in the neural network of the agent, the agent has a more powerful ability of processing a sequence problem. The following is specific content about the agent, the action, the environment, the state, and the reward in the Markov decision process.

For the agent and the action:

As a controller of the autonomous train, the agent selects an action $a_s$ at each segment s to control a force actually output by the train. To implement more stable train control, a value range of $a_s$ is [−1,1], and $a_s$ represents a ratio of the force actually output by the train to a maximum force that can be output. If $a_s<0$, the train outputs a braking force of $a_s\times bf^a(v^a(s'))$. If $a_s>0$, the train outputs a traction force of $a_s\times tf^a(v^a(s'))$. It should be noted herein that s' represents a previous segment, and a maximum braking force and traction force that can be output by a current segment s is obtained through calculation according to an end speed of the previous segment s'.

For the environment and the state:

As shown in FIG. 2, the environment is composed of two parts. The first part is the train dynamics simulation under the virtual coupling based on the formula (1) to the formula (9), and the second part is the train operation scenario. A maximum speed trajectory of the autonomous train and a planned speed trajectory of the front train are generated according to a line topological structure, a station dwell mode, speed restriction information, and the like.

The state of the autonomous train is composed of nine factors, which is as shown in a formula (11):

$$\phi_s=\left[v^a(s'),\ d(s'),\ l(s),\ V^a(s),\ rrt^a(s'),\ rd^a(s'),\ acc^a(s'),\ a_s^{max},\ a_s^{min}\right]; \tag{11}$$

and in the formula, $\phi_s$ represents the state of the Markov decision process; $v^a(s')$ represents the end speed of the autonomous train a at the segment s'; d(s') represents a position of a tail end of the segment s'; l(s) represents the length of the segment s; $V^a(s)$ represents a maximum speed of the autonomous train a at the segment s; $rrt^a(s')$ represents remaining operation time of the autonomous train a at the tail end of the segment s' to a next switch; $rd^a(s')$ represents a distance of the autonomous train a at the tail end of the segment s' to the next switch; $acc^a(s')$ represents acceleration of the autonomous train a at the tail end of the segment s';

$$a_s^{max}$$

represents a maximum safety action of the autonomous train a at the segment s; and $$a_s^{min}$$

represents a minimum safety action of the autonomous train a at the segment s.

For the reward:

A definition of the reward function is as shown in a formula (12):

$$r_s = \begin{cases} 1 - \frac{rt^a(s)}{\alpha} - \frac{ec^a(s)}{\beta} - \frac{\delta_{acc}^a(s)}{\gamma}, \text{case1} \\ \mu, \text{case2} \end{cases}; \tag{12}$$

and in the formula, $r_s$ represents a reward value; case1 represents that the action selected by the agent does not violate a constraint represented by the formula (8) or the formula (9); and μ represents a preset negative number, and a specific value of μ may be set according to actual requirements. For example, μ is a negative number with a relatively large absolute value; and case2 represents that the action selected by the agent violates the constraint represented by the formula (8) or the formula (9).

For ease of understanding the present invention, the following describes a specific process of the using a deep reinforcement learning algorithm TD3 to train a neural network and an agent in the Markov decision process, to obtain a trained neural network and agent.

Figure 4:
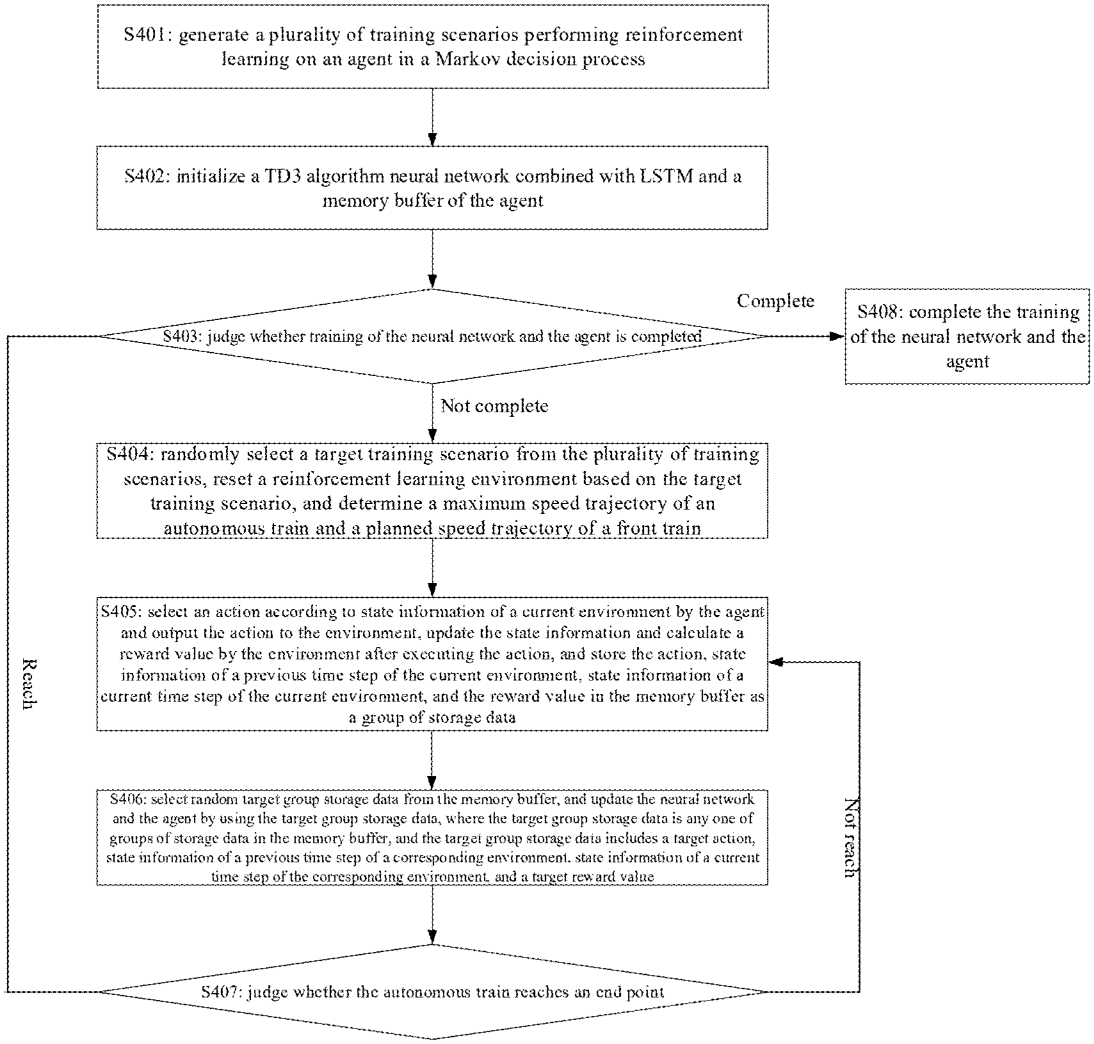
FIG. 4 is a schematic diagram of a training method of a neural network and an agent according to an embodiment of the present invention.
Figure 5A:
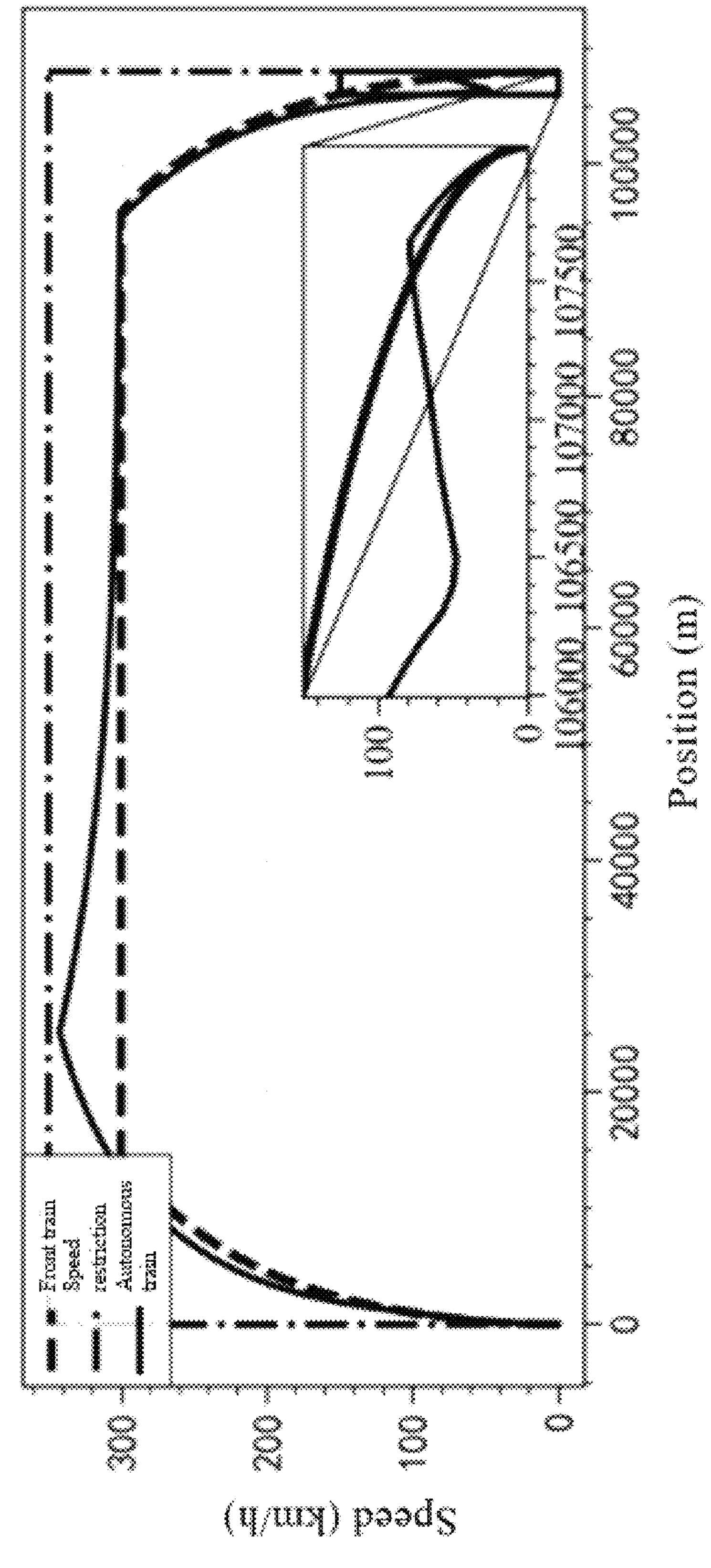
FIG. 5A to FIG. 5D are schematic diagrams of optimized autonomous train speed trajectories under four scenarios according to an embodiment of the present invention.
Figure 5B:
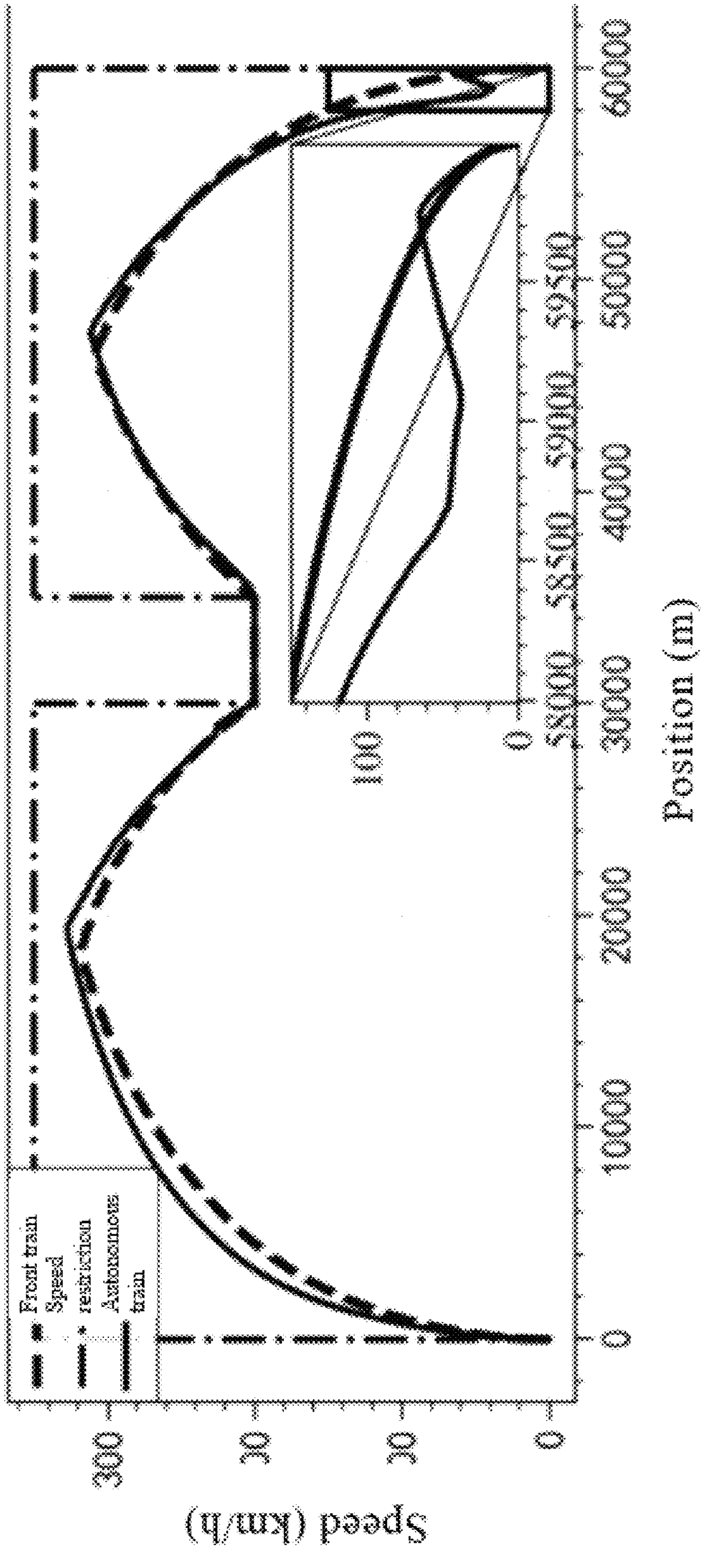
Figure 5C:
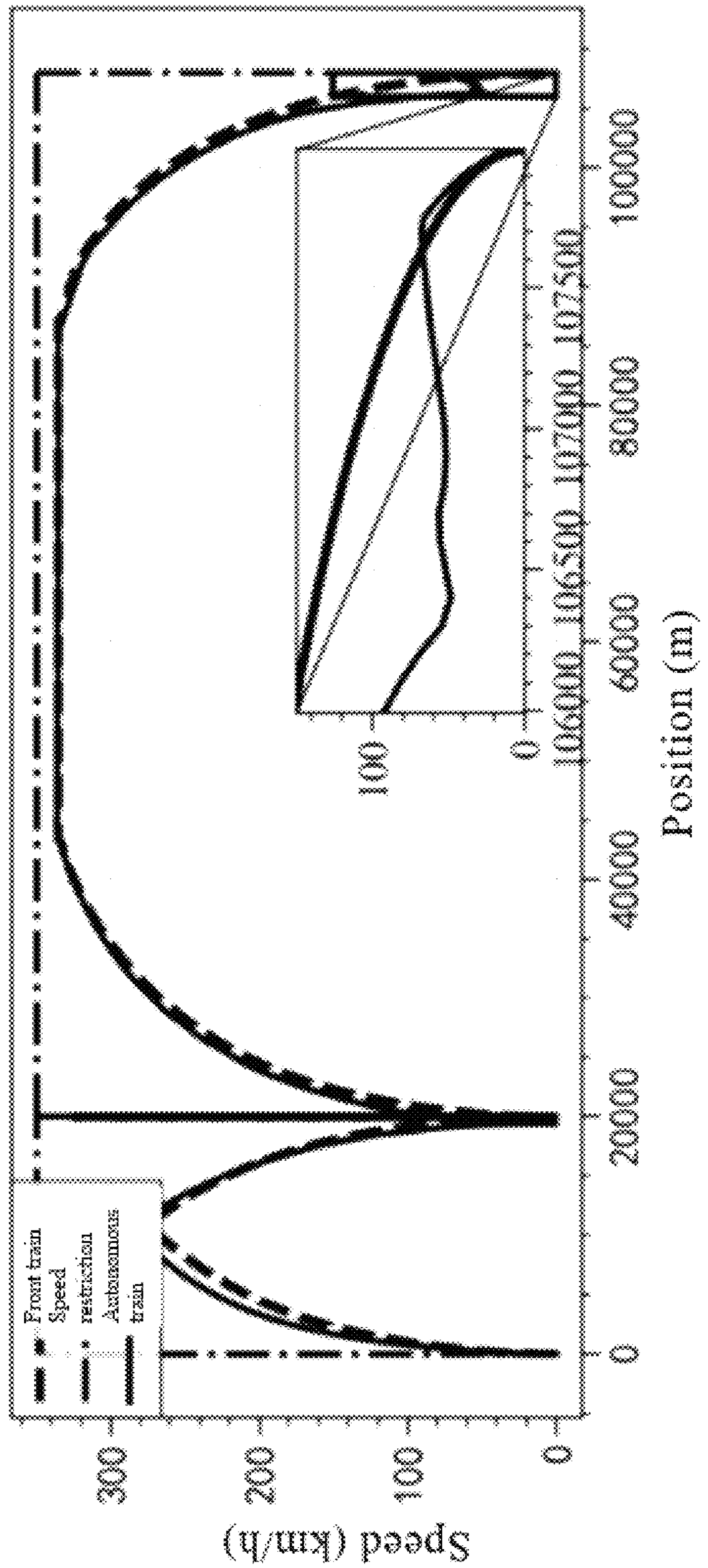
Figure 5D:
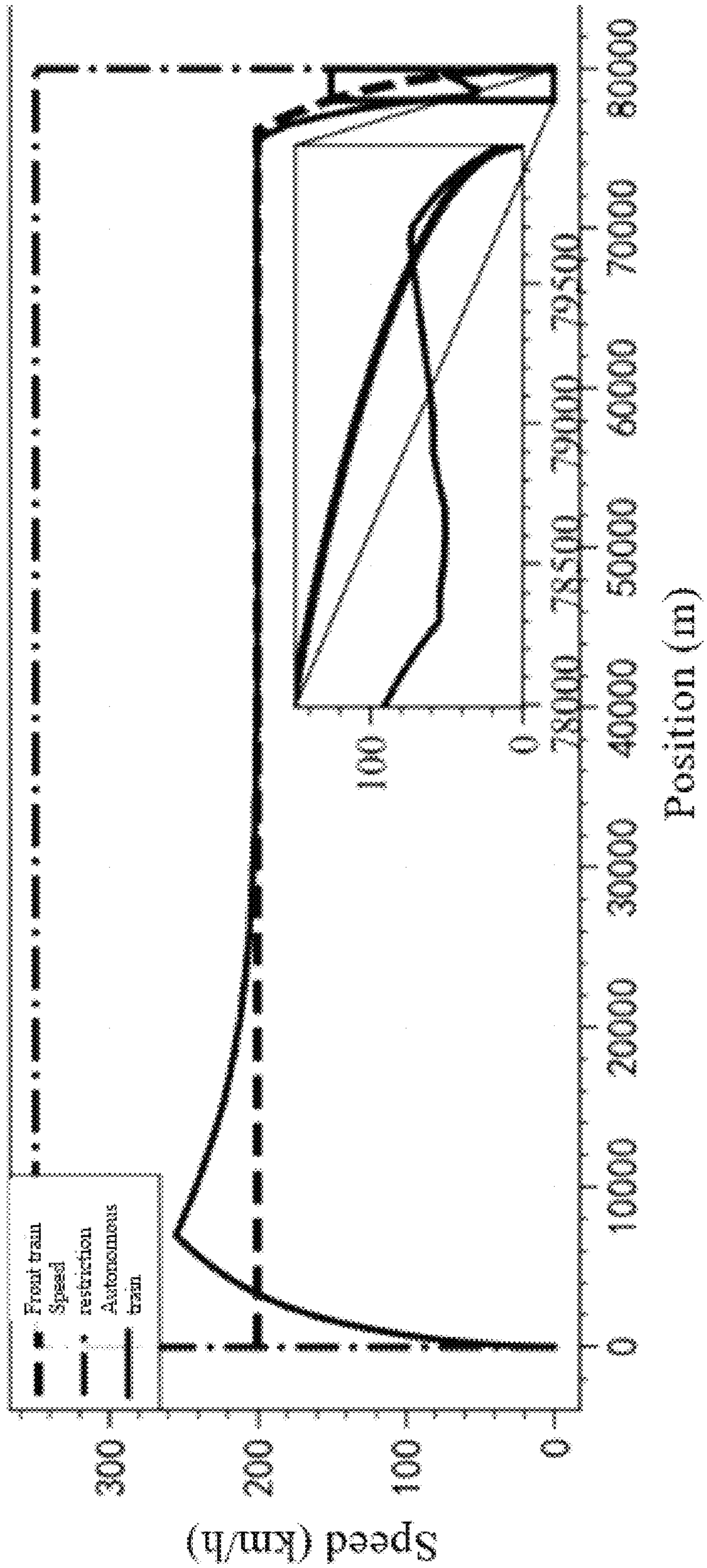

Optionally, referring to FIG. 4, FIG. 4 is a schematic diagram of a training method of a Markov decision process according to an embodiment of the present invention. As shown in FIG. 4, the training method includes:

step S401: generating a plurality of training scenarios performing reinforcement learning on the agent in the Markov decision process, where each training scenario in the plurality of training scenarios includes but is not limited to a line length, a line topological structure, and line speed restriction information;

step S402: initializing a TD3 algorithm neural network combined with LSTM and the memory buffer of the agent;

step S403: judging whether training of the neural network and the agent is completed;

if the training of the neural network and the agent is not completed, executing step S404; and if the training of the neural network and the agent is completed, executing step S408;

step S404: randomly selecting a target training scenario from the plurality of training scenarios, resetting a reinforcement learning environment based on the target training scenario, and determining the maximum speed trajectory of the autonomous train and a planned speed trajectory of the front train;

step S405: selecting an action according to state information of a current environment by the agent and outputting the action to the environment, updating the state information and calculating a reward value by the environment after executing the action, and storing the action, state information of a previous time step of the current environment, state information of a current time step of the current environment, and the reward value in the memory buffer as a group of storage data;

step S406: selecting random target group storage data from the memory buffer, and updating the neural network and the agent by using the target group storage data, where the target group storage data is any one of groups of storage data in the memory buffer, and the target group storage data includes a target action, state information of a previous time step of a corresponding environment, state information of a current time step of the corresponding environment, and a target reward value;

step S407: judging whether the autonomous train reaches an end point;

if the autonomous train does not reach the end point, returning to execute step S405; and if the autonomous train reaches the end point, returning to execute step S403; and step S408: completing the training of the neural network and the agent.

For step S140, a specific process of the deploying the trained neural network and agent to an autonomous train, to perform an autonomous train speed trajectory optimization decision may be set according to actual requirements. The embodiment of the present invention is not limited thereto.

Optionally, the trained neural network and agent are deployed to the autonomous train, and an operation scenario that requires autonomous train speed trajectory optimization is generated. Then the reinforcement learning environment is reset according to scenario data, and the maximum speed trajectory of the autonomous train and a planned speed trajectory of the front train are calculated. Then whether the autonomous train reaches the end point at the current time step is judged. If the autonomous train does not reach the end point at the current time step, the agent selects the action according to the state information of the current environment and outputs the action to the environment, and the environment updates the state information and calculates the reward value after executing the action and returns to execute the step of judging whether the autonomous train reaches the end point at the current time step until the autonomous train reaches the end point. If the autonomous train reaches the end point at the current time step, an optimized autonomous train speed trajectory and a train control sequence are output, and an output result is displayed visually.

It should be noted herein that the agent and the agent may be the same controller or may not be the same controller.

Therefore, through the above technical solutions, a speed trajectory optimization model of the autonomous train under a virtual coupling operation is constructed, and an influence of an internal structure of a station on coupling and decoupling is considered, so that safe and efficient operations and dynamic coupling and decoupling processes of the autonomous train are implemented.

The constructed model is converted into the Markov decision process, and in a large amount of operation scenarios, an LSTM-TD3 algorithm is used to train the agent used as the controller of the autonomous train to learn a control sequence generation policy, to implement a real-time decision of the autonomous train.

To enable a person skilled in the art to learn about the technical solutions of the present invention more clearly, the technology will be described below with reference to specific scenarios.

Specifically, training of the agent and applied scenarios and data are selected from true data of Beijing-Shanghai high-speed railway. After the agent is trained, four scenarios are selected to test the agent. Test scenario information is as shown in the following Table 1. A first column is a scenario serial number. A second column represents a station dwell mode of the autonomous train and the front train thereof at two front and rear stations, for example, [(0, 1), (1, 1)] represents that the front train does not stop at a first station and stops at a second station, and the autonomous train stops at both the first station and the second station. Data in a third column is the total length of a scenario. Data in a final column is temporary speed restriction information, for example, [10000, 20000]: 200 represents that a start point and an end point of a temporary speed restriction segment are 10000 m and 20000 m respectively, and a speed restriction value is 200 km/h. In a third scenario, both temporary speed restriction start point and end point are 20000 m, and a speed restriction value is 0, which represents that the scenario is an interrupt scenario. Results obtained by the trained agent in four test scenarios are as shown in FIG. 5A to FIG. 5D.

TABLE 1

| Scenario serial number | Station dwell mode | Total length | Temporary speed restriction |
|---|---|---|---|
| 1 | [(1, 1), (1, 1)] | 100800 | — |
| 2 | [(1, 1), (1, 1)] | 40000 | [10000, 20000]: 200 |
| 3 | [(1, 1), (1, 1)] | 100800 | [20000, 20000]: 0 |
| 4 | [(0, 1), (1, 1)] | 80000 | — |

It should be understood that the above integration-oriented intelligent speed trajectory optimization method for an autonomous train is exemplary only. A person skilled in the art may make various variations according to the above method, and modified or variated content falls within the protection scope of the present invention.

Figure 6:
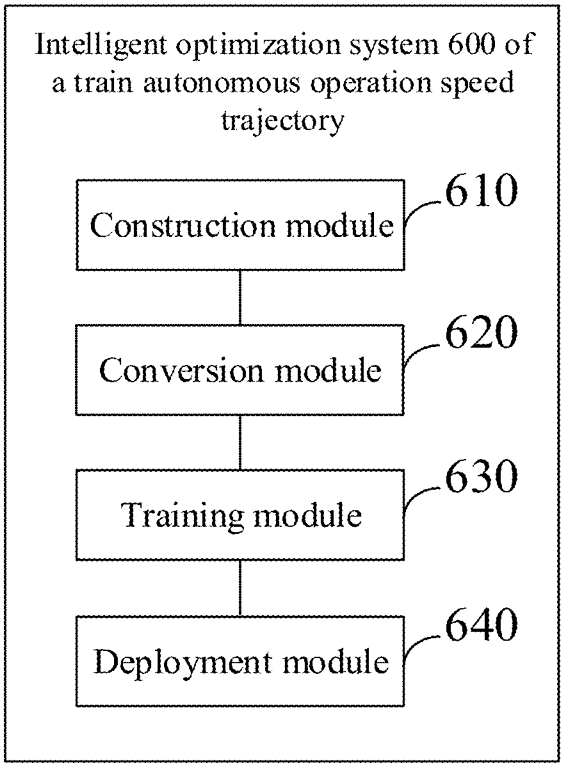
FIG. 6 is a schematic diagram of an integration-oriented intelligent speed trajectory optimization system for an autonomous train according to an embodiment of the present invention.

Referring to FIG. 6, FIG. 6 is a flowchart of an integration-oriented intelligent speed trajectory optimization system 600 for an autonomous train according to an embodiment of the present invention. It should be understood that the system 600 can execute various steps in the above method embodiments. For a specific function of the system 600, reference may be made to the above descriptions, and to avoid repetition, detailed descriptions are appropriately omitted herein. The system 600 includes at least one software functional module that can be stored in a memory or solidified in an operating system (OS) of the system 600 in a software or firmware form. Specifically, the system 600 includes:

a construction module 610, configured to construct an autonomous train speed trajectory optimization model under virtual coupling based on a discrete distance;

a conversion module 620, configured to convert the autonomous train speed trajectory optimization model into a Markov decision process;

a training module 630, configured to use a deep reinforcement learning algorithm TD3 to train a neural network and an agent in the Markov decision process, to obtain a trained neural network and agent; and a deployment module 640, configured to deploy the trained neural network and agent to an autonomous train, to perform an autonomous train speed trajectory optimization decision.

The autonomous train speed trajectory optimization model includes a plurality of constraint conditions; a first constraint condition in the plurality of constraint conditions is as follows:

$$d(s)+ebd(v^a(s))+\Delta_l+\Delta_{sm}\le P^l(t(s))+ebd\left(V^l(t(s))\right)$$

$$\forall\, s',\, s\in S \text{ if } P_{sw}^{out}\le d(s)+ebd(v^a(s))\le P_{sw}^{in};$$

and in the formula, s represents a segment index; ebd($v^a$(s)) represents an emergency braking distance of an autonomous train a at a segment s when an end speed is v(s); $\Delta_l$ represents a length of a front train; $\Delta_{sm}$ represents a minimum safety margin; $P^l$(t(s)) represents a position of the front train at a moment t(s); t(s) represents time for the autonomous train to operate to a tail end of the segment s; $V^l$(t(s)) represents a speed of the front train at the moment t(s); s' represents a segment that is connected to and in front of the segment s; S represents a segment index set;

$$P_{sw}^{out}$$

represents a position of an outbound switch junction; and $$P_{sw}^{in}$$

represents a position of an inbound switch junction.

Since the system described in the above embodiment of the present invention is a system used to implement the method of the above embodiment of the present invention, based on the method described in the above embodiment of the present invention, a person skilled in the art can learn about a specific structure and variation of the system/apparatus. Therefore, details are not described herein again. All the systems used in the method of the embodiment of the present invention belong to the protection scope of the present invention.

Figure 7:
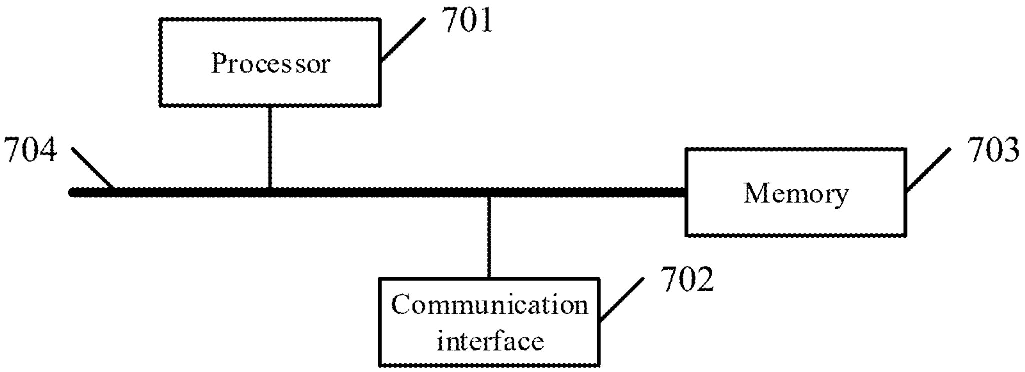
FIG. 7 is a block diagram of an electronic device according to an embodiment of the present invention.

In addition, as shown in FIG. 7, an embodiment of the present invention further provides an electronic device, including a processor 701, a communication interface 702, a memory 703, and a communication bus 704. The processor 701, the communication interface 702, and the memory 703 communicate with each other through the communication bus 704.

The memory 703 is configured to store a computer program.

The processor 701 implements the following steps when configured to execute the program stored on the memory 703:

constructing an autonomous train speed trajectory optimization model under virtual coupling based on a discrete distance; converting the autonomous train speed trajectory optimization model into a Markov decision process; using a deep reinforcement learning algorithm TD3 to train a neural network and an agent in the Markov decision process, to obtain a trained neural network and agent; and deploying the trained neural network and agent to an autonomous train, to perform an autonomous train speed trajectory optimization decision.

The autonomous train speed trajectory optimization model includes a plurality of constraint conditions; a first constraint condition in the plurality of constraint conditions is as follows:

$$d(s)+ebd(v^a(s))+\Delta_l+\Delta_{sm}\le P^l(t(s))+ebd\left(V^l(t(s))\right);$$

$$\forall\, s',\, s\in S \text{ if } P_{sw}^{out}\le d(s)+ebd(v^a(s))\le P_{sw}^{in};$$

and in the formula, s represents a segment index; $ebd(v^a(s))$ represents an emergency braking distance of an autonomous train a at a segment s when an end speed is v(s); $\Delta_l$ represents a length of a front train; $\Delta_{sm}$ represents a minimum safety margin; $P^l(t(s))$ represents a position of the front train at a moment t(s); t(s) represents time for the autonomous train to operate to a tail end of the segment s; $V^l(t(s))$ represents a speed of the front train at the moment t(s); s' represents a segment that is connected to and in front of the segment s; S represents a segment index set;

$$P_{sw}^{out}$$

represents a position of an outbound switch; and $$P_{sw}^{in}$$

represents a position of an inbound switch.

The communication bus in the above terminal may be a peripheral component interconnect (PCI) bus, an extended industry standard architecture (EISA) bus, or the like. The communication bus may be classified into an address bus, a data bus, a control bus, and the like. For ease of representation, only one thick line is used for representation in the figure, but it does not mean that there is only one bus or one type of bus.

The communication interface is configured for communication between the above terminal and another device.

The memory may include a random access memory (RAM) or a non-volatile memory, for example, at least one disk memory. Optionally, the memory may also be at least one storage device located far away from the above-mentioned processor.

The above processor may be a general-purpose processor, including a central processing unit (CPU), a network processor (NP), and the like, or may also be a digital signal processor (DSP), an application specific integrated circuit (ASIC), a field-programmable gate array (FPGA), or any other programmable logic device, discrete gate or transistor logic device, and discrete hardware component.

Figure 8:
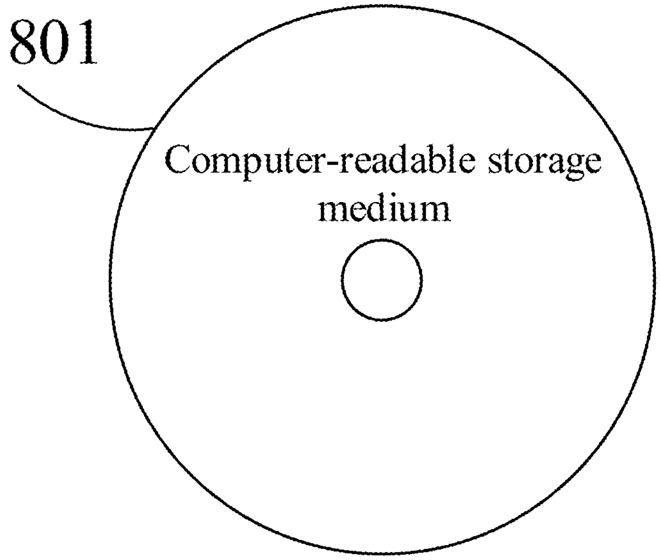
FIG. 8 is a schematic diagram of a computer-readable storage medium according to an embodiment of the present invention.

As shown in FIG. 8, in another embodiment of the present invention, a computer-readable storage medium 801 is further provided. The computer-readable storage medium stores an instruction, and when the instruction is executed on a computer, the computer executes the integration-oriented intelligent speed trajectory optimization method for an autonomous train in the above embodiments.

In in another embodiment of the present invention, a computer program product including an instruction is further provided. When the computer program product is executed on a computer, the computer executes the integration-oriented intelligent speed trajectory optimization method for an autonomous train in the above embodiments.

A person skilled in the art should understand that the embodiments of the present invention may be provided as a method, a system, or a computer program product. Therefore, the present invention may be in the form of a hardware only embodiment, a software only embodiment, or an embodiment with a combination of software and hardware. Moreover, the present invention may be in the form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system) and the computer program product according to the embodiments of the present invention. It should be understood that a computer program instruction may be used to implement each process and/or each block in the flowcharts and/or the block diagrams and a combination of a process and/or a block in the flowcharts and/or the block diagrams.

It should be noted that in the claims, any reference numerals located between parentheses shall not be construed as limiting the claims. The word "comprise" does not exclude the presence of components or steps not listed in the claims. The word "a/an" or "one" preceding a component does not exclude the presence of a plurality of such components. The present invention may be implemented by means of hardware including a plurality of different components and by means of a suitably programmed computer. In the claims enumerating a plurality of apparatuses, a plurality of apparatuses in these apparatuses may be embodied by the same hardware. The use of the words: first, second, third, and the like is for description convenience only and does not represent any order. These terms may be understood as a part of a component name.

In addition, it should be noted that in the description of the specification, descriptions of terms such as "an embodiment", "some embodiments", "embodiment", "example", "specific example", "some examples", or the like mean that a specific feature, structure, material, or characteristic described in conjunction with the embodiment or example is included in at least one embodiment or example of the present invention. In this specification, the schematic expressions of the above terms do not necessarily refer to the same embodiment or example. Moreover, the specific feature, structure, material, or characteristic described may be combined in any suitable manner in any one or more embodiments or examples. In addition, different embodiments or examples described in the specification and features of different embodiments or examples may be combined and integrated by a person skilled in the art without contradicting each other.

Although the preferred embodiments of the present invention have been described, a person skilled in the art can make additional changes and modifications to these embodiments after knowing the basic inventive concept. Therefore, the claims should be construed as encompassing the preferred embodiments and all the changes and modifications falling in the scope of the present invention.

Apparently, various modifications and variations to the present invention can be made by a person skilled in the art without departing from the spirit and scope of the present invention. Thereby, the present invention should also encompass all such modifications and variations within the scope of the claims of the present invention and its equivalents.

What is claimed is:

1. An integration-oriented intelligent speed trajectory optimization method for an autonomous train, comprising:

constructing an autonomous train speed trajectory optimization model under virtual coupling based on a discrete distance;

converting the autonomous train speed trajectory optimization model into a Markov decision process;

using a deep reinforcement learning algorithm TD3 to train a neural network and an agent in the Markov decision process, to obtain a trained neural network and agent; and deploying the trained neural network and agent to an autonomous train, to perform an autonomous train speed trajectory optimization decision, wherein the autonomous train speed trajectory optimization model comprises a plurality of constraint conditions; a first constraint condition in the plurality of constraint conditions is as follows:

$$d(s)+ebd(v^a(s))+\Delta_l+\Delta_{sm}\leq P^l(t(s))+ebd\big(V^l(t(s))\big);$$

$$\forall\, s',\, s\in S \text{ if } P_{sw}^{out}\leq d(s)+ebd(v^a(s))\leq P_{sw}^{in};$$

and in the formula, s represents a segment index; ebd($v^a$(s)) represents an emergency braking distance of an autonomous train a at a segment s when an end speed is v(s); $\Delta_l$ represents a length of a front train; $\Delta_{sm}$ represents a minimum safety margin; $P^l$(t(s)) represents a position of the front train at a moment t(s); t(s) represents time for the autonomous train to operate to a tail end of the segment s; $V^l$(t(s)) represents a speed of the front train at the moment t(s); s' represents a segment that is connected to and in front of the segment s; S represents a segment index set;

$$P_{sw}^{out}$$

represents a position of an outbound switch; and $$P_{sw}^{in}$$

represents a position of an inbound switch; and wherein the autonomous train speed trajectory optimization model further comprises an objective function; the objective function is as follows:

$$J=\sum\nolimits_{s\in S}[\alpha\times rt^a(s)+\beta\times ec^a(s)+\gamma\times\delta_{acc}^a(s)];$$

and in the formula, J represents a minimum objective function value; α represents a first weight; $rt^a$(s) represents total operation time of the autonomous train a at the segment s; β represents a second weight; $ec^a$(s) represents total operation energy consumption of the autonomous train a at the segment s; γ represents a third weight; and $$\delta_{acc}^a$$

represents an accumulated value of an acceleration change of the autonomous train a at the segment s.

2. The method according to the claim 1, wherein a second constraint condition in the plurality of constraint conditions is as follows:

$$\begin{cases} t^a(S_{sw}^{out}-1)\geq t_{out}^l+\Delta_{sw} \\ t^a\big(S_{sw}^{in}-1\big)\geq t_{in}^l+\Delta_{sw} \end{cases};$$

and in the formula, $$S_{sw}^{out}$$

represents a segment index at which an outbound switch is located;

$$t^a(S_{sw}^{out}-1)$$

represents time for the autonomous train a to reach the outbound switch;

$$t_{out}^l$$

represents time for the front train to leave the outbound switch; $\Delta_{sw}$ represents duration of a switch rotation action;

$$S_{sw}^{in}$$

represents a segment index at which an inbound switch is located;

$$t^a\big(S_{sw}^{in}-1\big)$$

represents time for the autonomous train a to reach the inbound switch; and $$t_{in}^l$$

represents time for the front train to leave the inbound switch.

3. The method according to claim 2, wherein the using a deep reinforcement learning algorithm TD3 to train a neural network and an agent in the Markov decision process comprises:

generating a plurality of training scenarios performing reinforcement learning on the agent in the Markov decision process, wherein each training scenario in the plurality of training scenarios comprises but is not limited to a line length, a line topological structure, and line speed restriction information;

a training completion judgment step: judging whether training of the neural network and the agent is completed;

if the training of the neural network and the agent is not completed, randomly selecting a target training scenario from the plurality of training scenarios, resetting a reinforcement learning environment based on the target training scenario, and determining a maximum speed trajectory of the autonomous train and a planned speed trajectory of the front train; a storage execution step: selecting an action according to state information of a current environment by the agent and outputting the action to the environment, updating the state information and calculating a reward value by the environment after executing the action, storing the action, state information of a previous time step of the current environment, state information of a current time step of the current environment, and the reward value in a memory buffer as a group of storage data, selecting random target group storage data from the memory buffer, and updating a parameter of the neural network by using the target group storage data;

judging whether the autonomous train reaches an end point; and if the autonomous train does not reach the end point, returning to execute the storage execution step; and if the autonomous train reaches the end point, returning to the training completion judgment step, and until the training is completed, stopping a cycle.

4. The method according to claim 3, wherein a state of the Markov decision process is as follows:

$$\phi_s = \left[v^a(s'),\ d(s'),\ l(s),\ V^a(s),\ rrt^a(s'),\ rd^a(s'),\ acc^a(s'),\ a_s^{max},\ a_s^{min}\right];$$

and in the formula, $\phi_s$ represents the state of the Markov decision process; $v^a(s')$ represents an end speed of the autonomous train a at a segment s'; d(s') represents a position of a tail end of the segment s'; l(s) represents a length of the segment s; $V^a(s)$ represents a maximum speed of the autonomous train a at the segment s; $rrt^a(s')$ represents remaining operation time of the autonomous train a at the tail end of the segment s' to a next switch; $rd^a(s')$ represents a distance of the autonomous train a at the tail end of the segment s' to the next switch; $acc^a(s')$ represents acceleration of the autonomous train a at the tail end of the segment s';

$$a_s^{max}$$

represents a maximum safety action of the autonomous train a at the segment s; and $$a_s^{min}$$

represents a minimum safety action of the autonomous train a at the segment s.

5. The method according to claim 3, wherein a reward function of the Markov decision process is as follows:

$$r_s = \begin{cases} 1 - \dfrac{rt^a(s)}{\alpha} - \dfrac{ec^a(s)}{\beta} - \dfrac{\delta_{acc}^a(s)}{\gamma}, & \text{case1} \\ \mu, & \text{case2} \end{cases};$$

and in the formula, $r_s$ represents the reward value; case1 represents that the action selected by the agent does not violate a constraint of the first constraint condition or the second constraint condition; μ represents a preset negative number; and case2 represents that the action selected by the agent violates the constraint of the first constraint condition or the second constraint condition.

6. The method according to claim 3, wherein an environment of the Markov decision process comprises a train dynamics simulation environment and a train operation environment under the virtual coupling.

7. An electronic device, comprising a processor, a memory, and a computer program stored on the memory, wherein the processor executes the computer program to implement the integration-oriented intelligent speed trajectory optimization method for an autonomous train according to claim 1.

* * * * *